United States Patent
Huang et al.

(10) Patent No.: US 12,401,315 B2
(45) Date of Patent: Aug. 26, 2025

(54) GPS POSITIONING STAKE WITH SOLAR PANEL ADJUSTABLE IN ANGLE

(71) Applicant: DURQ MACHINERY CORP., Taichung (TW)

(72) Inventors: Yu-Chia Huang, Taichung (TW); Fu-Peng Chou, Taichung (TW)

(73) Assignee: DURQ MACHINERY CORP., Taichung (TW)

( * ) Notice: Subject to any disclaimer, the term of this patent is extended or adjusted under 35 U.S.C. 154(b) by 0 days.

(21) Appl. No.: 18/654,363

(22) Filed: May 3, 2024

(65) Prior Publication Data
US 2024/0380358 A1 Nov. 14, 2024

(30) Foreign Application Priority Data
May 12, 2023 (DE) .......................... 102023112556.7

(51) Int. Cl.
| | |
|---|---|
| *H02S 20/32* | (2014.01) |
| *A01D 34/00* | (2006.01) |
| *G01S 19/13* | (2010.01) |
| *A01D 101/00* | (2006.01) |

(52) U.S. Cl.
CPC .............. *H02S 20/32* (2014.12); *G01S 19/13* (2013.01); *A01D 34/008* (2013.01); *A01D 2101/00* (2013.01)

(58) Field of Classification Search
CPC .......... H02S 20/32; H02S 20/30; G01S 19/13; A01D 34/008
See application file for complete search history.

(56) References Cited

U.S. PATENT DOCUMENTS

| | | | | |
|---|---|---|---|---|
| 2011/0120523 | A1* | 5/2011 | Silver | F24S 30/452 136/246 |
| 2012/0227788 | A1* | 9/2012 | Lundahl | H02S 20/30 136/246 |
| 2014/0174499 | A1* | 6/2014 | Fitzgerald | H02S 20/32 136/246 |
| 2014/0283894 | A1* | 9/2014 | Silver | F24S 25/70 136/246 |

FOREIGN PATENT DOCUMENTS

| | | | |
|---|---|---|---|
| CN | 215345883 | * | 12/2021 |
| CN | 215345883 U | | 12/2021 |

* cited by examiner

*Primary Examiner* — Jayne L Mershon
(74) *Attorney, Agent, or Firm* — Muncy, Geissler, Olds & Lowe, P.C.

(57) ABSTRACT

A GPS positioning stake includes a supporting pole, a base connected with the supporting pole and having a GPS positioning module and a rotation axle, an adjustment board having an axle sleeving portion pivotably connected with the rotation axle and a solar panel providing electric energy for the operation of the GPS positioning module, and an angle adjusting device including a first gear fixedly sleeved onto the rotation axle, a second gear sleeved onto the rotation axle and located in the axle sleeving portion, an elastic member, and an operation member. The first and second gears engage when the operation member locks, disabling the adjustment board from rotation relative to the rotation axle, and separate when the operation member unlocks, enabling the adjustment board to drive the second gear to rotate relative to the rotation axle for adjusting the solar panel's light receiving angle for better energy conversion efficiency.

13 Claims, 21 Drawing Sheets

GPS POSITIONING STAKE WITH SOLAR PANEL ADJUSTABLE IN ANGLE

BACKGROUND OF THE INVENTION

1. Field of the Invention

The present invention relates to GPS positioning stakes and more particularly, to a GPS positioning stake with a solar panel adjustable in angle.

2. Description of the Related Art

The utility model patent CN215345883U disclosed a lawn mower positioning system which includes a base station and a lawn mower main body. The base station has a first GPS module and a first communication module. The lawn mower main body has a second GPS module, a second communication module and a control device. The lawn mower positioning system creates communication by the first and second communication modules, and uses the control device to receive signal obtained by the first and second GPS modules, so as to obtain positioning information of the lawn mower main body, that is simple in operation and easy in maintenance. However, the base station adopts a wired charging device (e.g. electric wire and charging socket) to provide electric energy for the operation of the first GPS module, so that the position of the placement of the base station is limited by the wired charging device. Therefore, the lawn mower positioning system disclosed by the aforementioned patent still needs improvement.

SUMMARY OF THE INVENTION

The present invention has been accomplished in view of the above-noted circumstances. The present invention provides a GPS positioning stake, which is self-powered by a solar panel, so the position of placement thereof is unlimited by the environment. Besides, the light receiving angle of the solar panel is adjustable for obtaining relatively better energy conversion efficiency.

To attain the above objective, the present invention provides a GPS positioning stake which includes a supporting pole, a base, an adjustment board, and an angle adjusting device. The base is connected with the supporting pole, and the base has a GPS positioning module and a rotation axle. The adjustment board has an axle sleeving portion and a solar panel. The axle sleeving portion is pivotably connected with the rotation axle. The solar panel provides electric energy for the operation of the GPS positioning module. The angle adjusting device includes a first gear, a second gear, an elastic member, and an operation member. The first gear is fixedly sleeved onto the rotation axle, and the first gear has a first teeth portion. The second gear is sleeved onto the rotation axle and located in the axle sleeving portion. The second gear is arranged in a way that the second gear is slidable along an axial direction of the rotation axle relative to the rotation axle and the axle sleeving portion, and able to be driven by the axle sleeving portion to rotate relative to the rotation axle. The second gear has a second teeth portion facing toward the first teeth portion. The elastic member provides an elastic force acted on the second gear to make the second gear displace toward the first gear. The operation member is sleeved onto the rotation axle in a way that the operation member is displaceable between a lock position and an unlock position. The operation member has a pushing portion located in the axle sleeving portion, and a force receiving portion exposed out of the axle sleeving portion. The force receiving portion is adapted to be pressed so that the operation member is displaced relative to the rotation axle from the lock position to the unlock position. When the operation member is located at the lock position, the second teeth portion is engaged with the first teeth portion to disable the axle sleeving portion of the adjustment board from rotation relative to the rotation axle. When the operation member is located at the unlock position, the pushing portion is inserted between the second teeth portion and the first teeth portion to separate the second teeth portion from the first teeth portion to enable the axle sleeving portion of the adjustment board to drive the second gear to rotate relative to the rotation axle.

By the above-described technical features, the GPS positioning stake of the present invention provides the electric energy for the operation of the GPS positioning module by the illumination of the sun on the solar panel, and the GPS positioning stake of the present invention allows the user to adjust the angle of the adjustment board to increase the probability of the solar panel being illuminated by the sun, so as to obtain relatively better energy conversion efficiency.

Preferably, the operation member is a pressed rod or a pulled rod; the pressed rod or the pulled rod is sleeved onto the rotation axle in a way that the pressed rod or the pulled rod is displaceable along a radial direction of the rotation axle. The pressed rod or the pulled rod of such design is reduced in volume.

Preferably, the second gear has a first slope; when the operation member is the pressed rod, the pushing portion of the pressed rod has a second slope, and the first slope is abutted on the second slope; when the operation member is the pulled rod, the pushing portion of the pulled rod has a third slope, and the first slope is abutted on the third slope. In this way, when the pressed rod is displaced from the lock position to the unlock position, the second slope of the pressed rod pushes the first slope of the second gear to make the second gear move along the axial direction of the rotation axle toward the direction away from the first gear, so as to separate the second teeth portion of the second gear from the first teeth portion of the first gear. When the pulled rod is displaced from the lock position to the unlock position, the third slope of the pulled rod pushes the first slope of the second gear to make the second gear move along the axial direction of the rotation axle toward the direction away from the first gear, so as to separate the second teeth portion of the second gear from the first teeth portion of the first gear.

Preferably, the base has a position limiting block; the first gear has a position limiting hole; when the first gear is sleeved onto the rotation axle, the position limiting block fits in the position limiting hole so that the first gear is fixedly sleeved onto the rotation axle firmly.

Preferably, the angle adjusting device includes a protecting cover fixedly disposed in the axle sleeving portion; the protecting cover has a bottom plate, an annular body portion extending from the bottom plate, an accommodating space formed by the bottom plate and the annular body portion, and a fixed pipe extending from the bottom plate and located in the annular body portion; the rotation axle of the base has a connecting portion; the fixed pipe is sleeved onto the connecting portion so that the axle sleeving portion is pivotable relative to the rotation axle.

Preferably, the protecting cover has two embedded protrusions located in the annular body portion; the second gear has two embedded recesses provided separately; the embedded protrusions are embedded in the embedded recesses, so that the second gear is displaceable relative to the protecting cover along the axial direction of the rotation axle, and also able to be driven by the protecting cover to rotate relative to the rotation axle.

Preferably, the second gear has a supporting portion; the elastic member is a coil spring and placed in the accommodating space of the protecting cover; an end of the elastic member is sleeved onto the supporting portion; another end of the elastic member is abutted on the bottom plate of the protecting cover.

Preferably, the adjustment board has a first end portion and a second end portion; the adjustment board is rotatable until the first end portion is abutted against the base, or the adjustment board is rotatable until the second end portion is abutted against the base. In this way, the first end portion and the second end portion can limit the angle, for which the adjustment board is rotatable.

To attain the above objective, the present invention provides another GPS positioning stake, which includes a supporting pole, a base, an adjustment board and an angle adjusting device. The base is connected with the supporting pole, and the base has a GPS positioning module and a rotation axle. The adjustment board has an axle sleeving portion and a solar panel. The axle sleeving portion is pivotable relative to the rotation axle, and an inner peripheral surface of the axle sleeving portion has a teeth portion. The solar panel provides electric energy for the operation of the GPS positioning module. The angle adjusting device includes an engaging gear, an elastic member, and an operation member. The engaging gear is sleeved onto the rotation axle and located in the axle sleeving portion. The engaging gear is arranged in a way that the engaging gear is slidable relative to the rotation axle along an axial direction of the rotation axle, and the engaging gear has an engaging teeth portion facing toward the teeth portion of the axle sleeving portion. The elastic member provides an elastic force acted on the engaging gear to make the engaging gear displace toward the teeth portion of the axle sleeving portion. The operation member is inserted in the axle sleeving portion in a way that the operation member is displaceable between a lock position and an unlock position. When the operation member is located at the lock position, the engaging teeth portion is engaged with the teeth portion of the axle sleeving portion to disable the adjustment board from rotation relative to the rotation axle. When the operation member is located at the unlock position, the operation member pushes the engaging gear to separate the engaging teeth portion from the teeth portion of the axle sleeving portion to enable the adjustment board to rotate relative to the rotation axle.

Preferably, the operation member is a button or a knob; the button or the knob is inserted in the axle sleeving portion in a way that the button or the knob is displaceable along an axial direction of the rotation axle.

Preferably, when the operation member is the knob, an outer peripheral surface of the knob has a thread, the inner peripheral surface of the axle sleeving portion has an annular flange, and the thread is abutted against the annular flange. In this way, the thread of the knob is guided by the annular flange of the axle sleeving portion to displace along the axial direction of the rotation axle.

Preferably, the engaging gear has a supporting portion; the elastic member is a coil spring; an end of the elastic member is sleeved onto the supporting portion; another end of the elastic member is sleeved onto the rotation axle and abutted against the base.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

First of all, it is to be mentioned that the technical features provided by the present invention are unlimited to the specific structure, usage and application thereof described in the detailed description of the invention. It should be understood by those skilled in the related art that all the terms used in the contents of the specification are for illustrative description. The directional terms mentioned in this specification, such as 'front, upper, lower, rear, left, right, top, bottom, in, and out', are also just for illustrative description on the basis of normal usage direction, not intended to limit the claimed scope.

Figure 1:
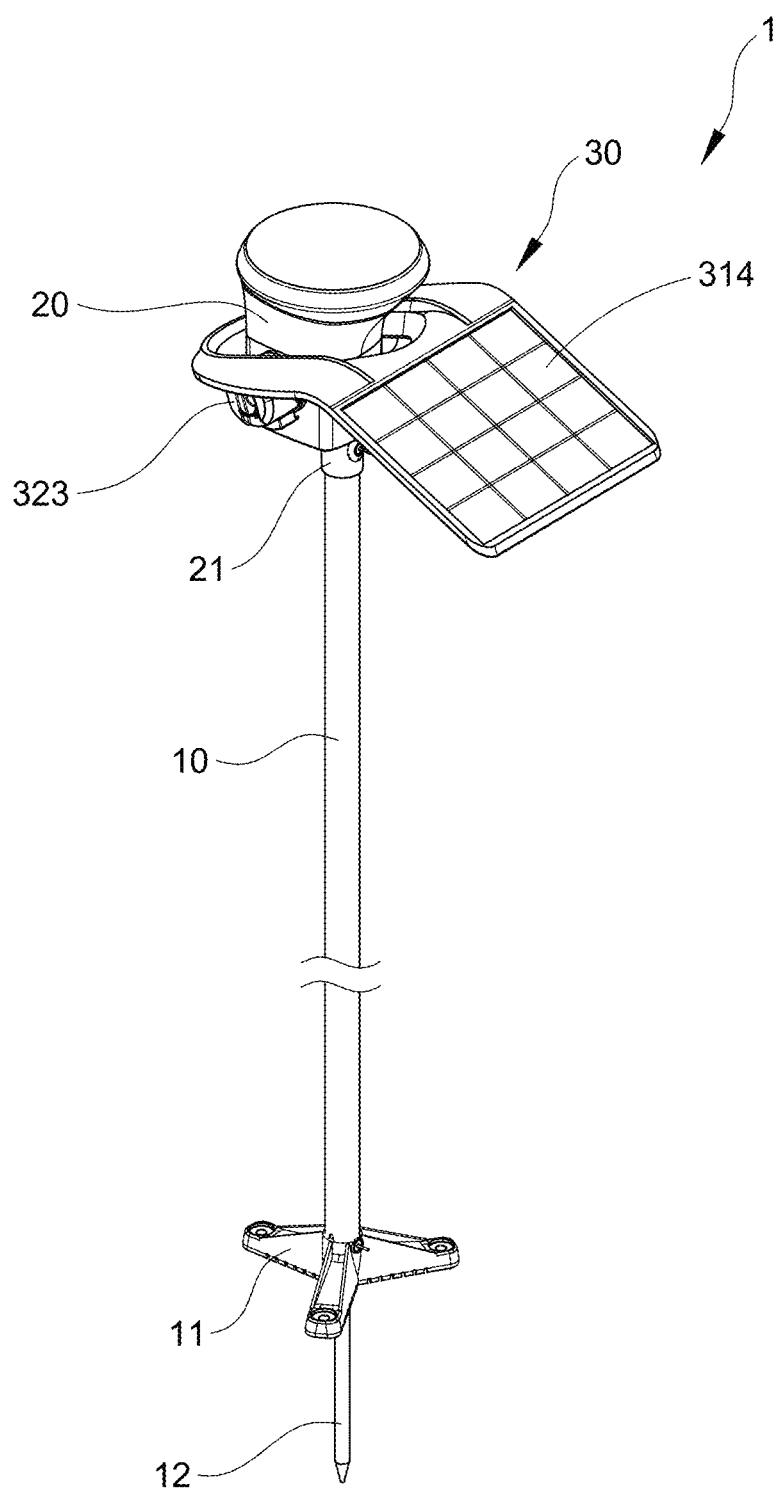
FIG. 1 is a perspective view of a GPS positioning stake of a first embodiment of the present invention.
Figure 2:
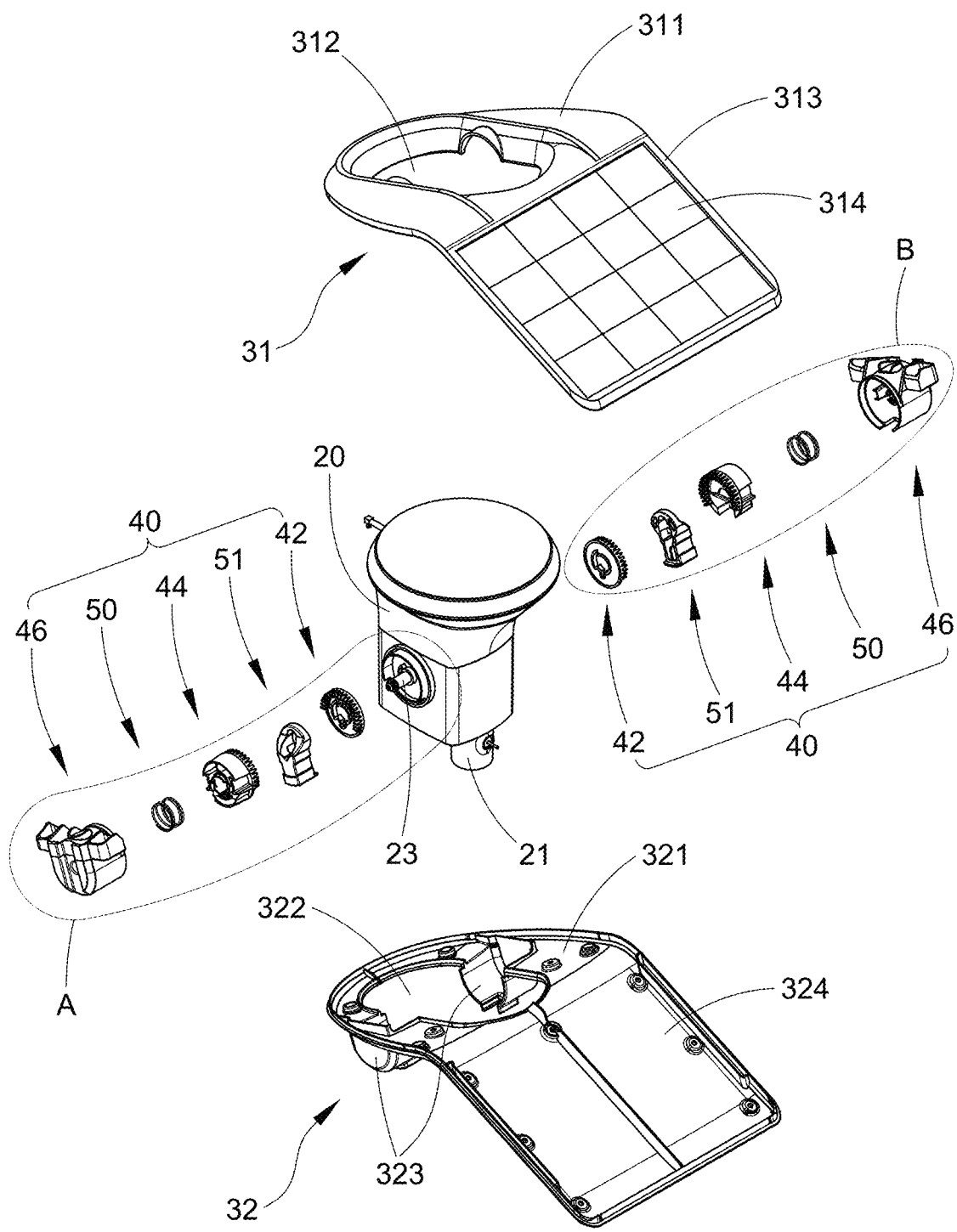
FIG. 2 is a partial exploded perspective view of the GPS positioning stake of the first embodiment of the present invention.

Referring to FIG. 1 and FIG. 2, a GPS positioning stake 1 of a first embodiment of the present invention includes a supporting pole 10, a base 20, an adjustment board 30, and two angle adjusting devices 40. In practice, it may include only one angle adjusting device 40.

The supporting pole 10 is a telescopic rod, the bottom end of which has a trident seat 11 and an inserting portion 12 located below the trident seat 11. The inserting portion 12 can be inserted into a predetermined inserting hole (not shown) or directly inserted into the ground. Then, the trident seat 11 is stably supported on the ground to make the supporting effect of the supporting pole 10 better.

Figure 3:
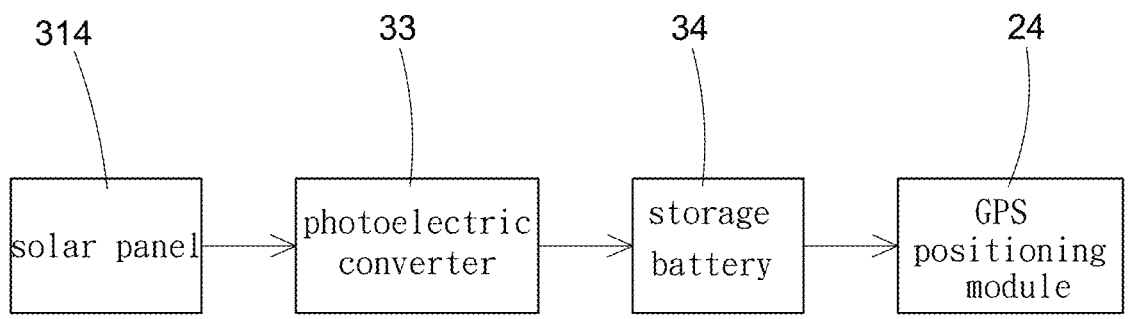
FIG. 3 is a system block diagram showing an operating mode between a GPS positioning module and a solar panel.
Figure 4:
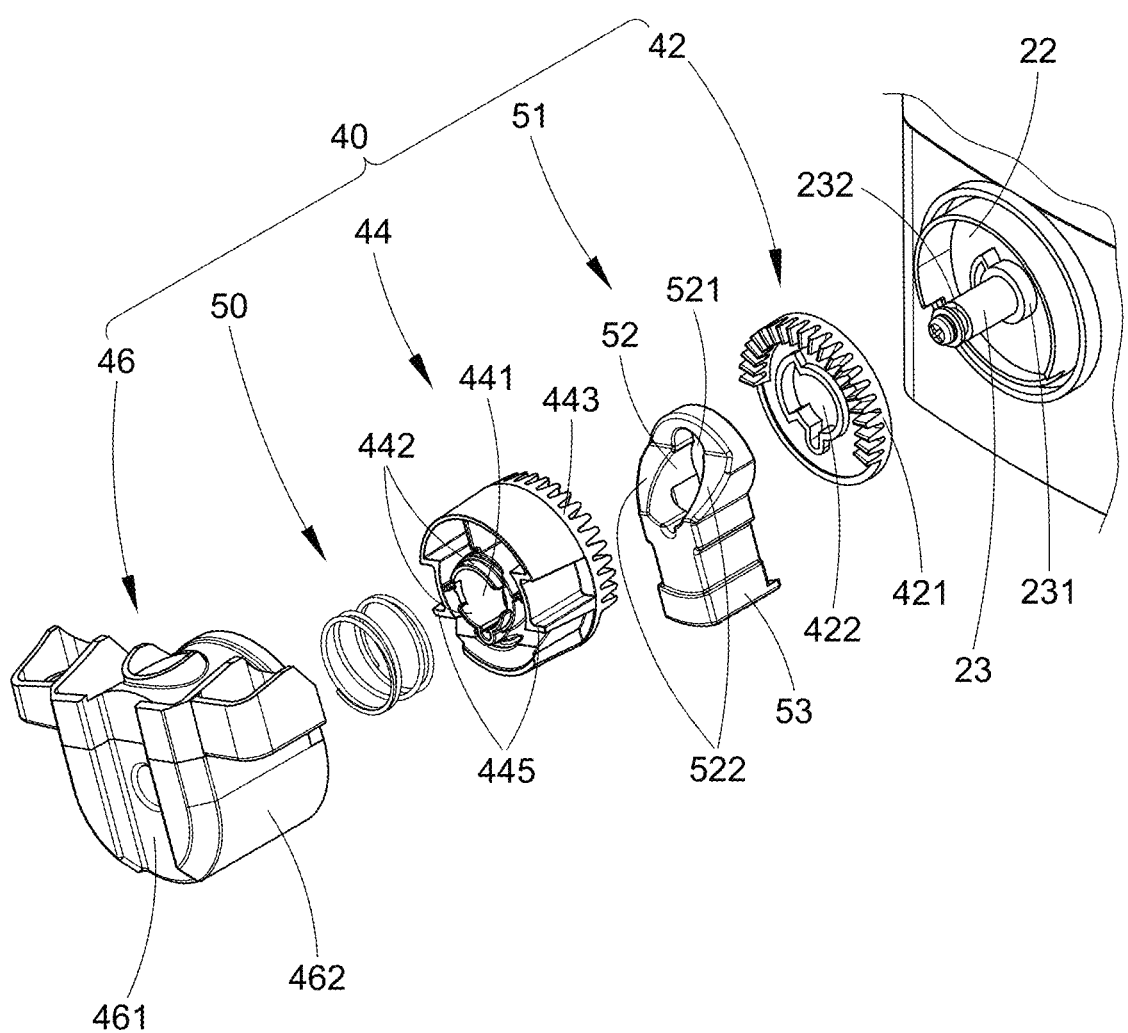
FIG. 4 is an enlarged view of the part A in FIG. 2.

Referring to FIG. 2 to FIG. 4, the bottom end of the base 20 has a connecting portion 21 connected with the supporting pole 10. Two opposite outsides of the base 20 each have a fixed seat 22. Each fixed seat 22 has a rotation axle 23 and a position limiting block 231 fixedly disposed on the rotation axle 23. The rotation axle 23 is provided at the free end thereof with a connecting portion 232. The inside of the base 20 has a GPS positioning module 24 as shown in FIG. 3. The GPS positioning module 24 is arranged to provide satellite positioning signal to a robotic lawn mower (not shown).

The adjustment board 30 includes an upper covering plate 31 and a lower covering plate 32. The upper covering plate 31 has an upper adjustment section 311, an upper slot 312 penetrating through the upper adjustment section 311, and an upper bearing section 313 connected with the upper adjustment section 311 and inclined downwardly. The upper bearing section 313 is arranged for the placement of a solar panel 314. As shown in FIG. 3, the solar panel 314 receives sunlight, then convert direct current into alternating current by a photoelectric converter 33, and stores the power produced thereby into a storage battery 34 for providing electric energy for the operation of the GPS positioning module 24 of the base 20. The lower covering plate 32 has a lower adjustment section 321, a lower slot 322 penetrating through the lower adjustment section 321, two axle sleeving portions 323 oppositely provided on the lower adjustment section 321, and a lower bearing section 324 connected with the lower adjustment section 321 and inclined downwardly. The lower adjustment section 321 of the lower covering plate 32 is combined with the upper adjustment section 311 of the upper covering plate 31, and the lower bearing section 324 of the lower covering plate 32 is combined with the upper bearing section 313 of the upper covering plate 31, so that the lower slot 322 of the lower covering plate 32 communicates with the upper slot 312 of the upper covering plate 31. The adjustment board 30 is sleeved onto the base 20 by the upper and lower slots 312 and 322. Besides, the adjustment board 30 is pivotably sleeved onto the fixed seats 22 of the base 20 by the two axle sleeving portions 323 of the lower covering plate 32, and accommodates the rotation axles 23 of the base 20 therein.

The angle adjusting devices 40 are accommodated in the axle sleeving portions 323 of the adjustment board 30, and each angle adjusting device 40 includes a first gear 42, a second gear 44, a protecting cover 46, an elastic member 50 and an operation member 51.

Figure 5:
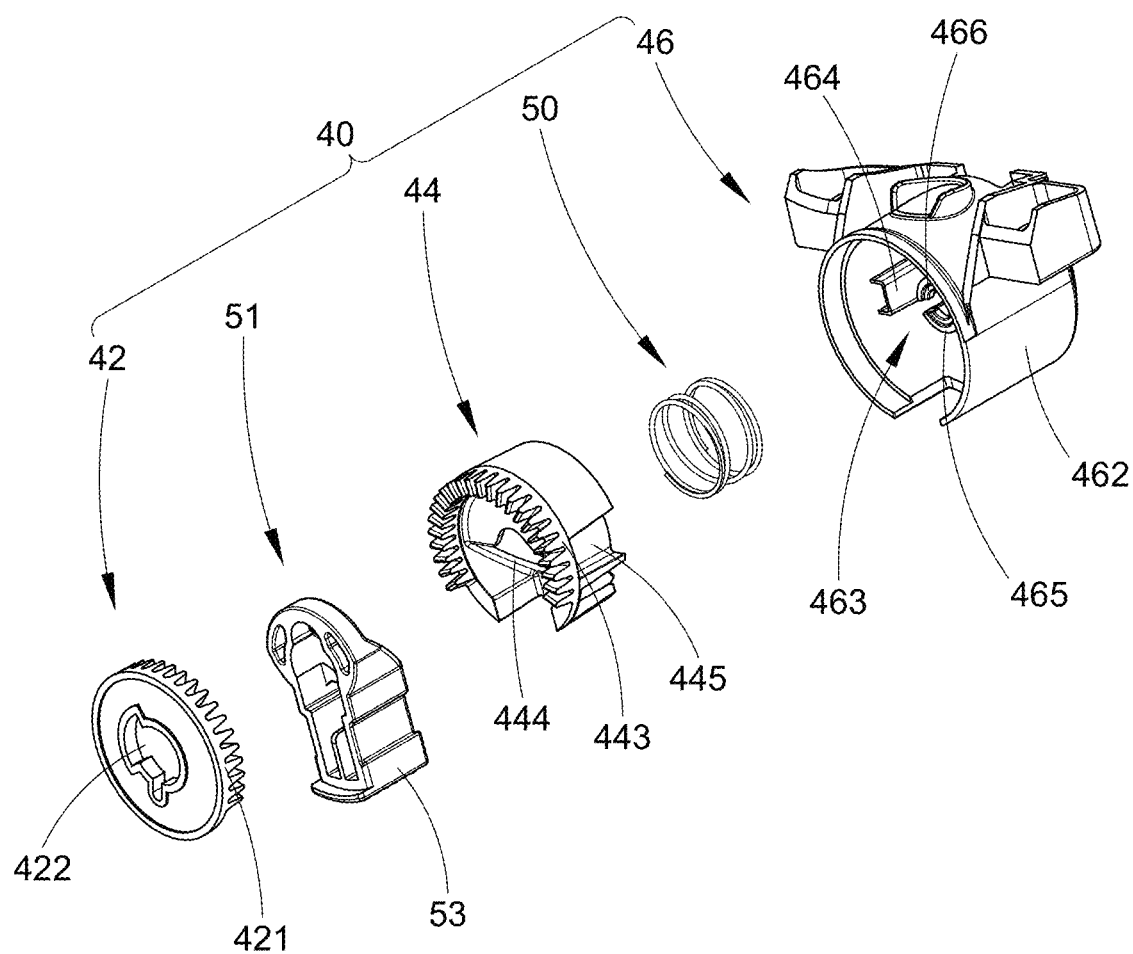
FIG. 5 is an enlarged view of the part B in FIG. 2.
Figure 6:
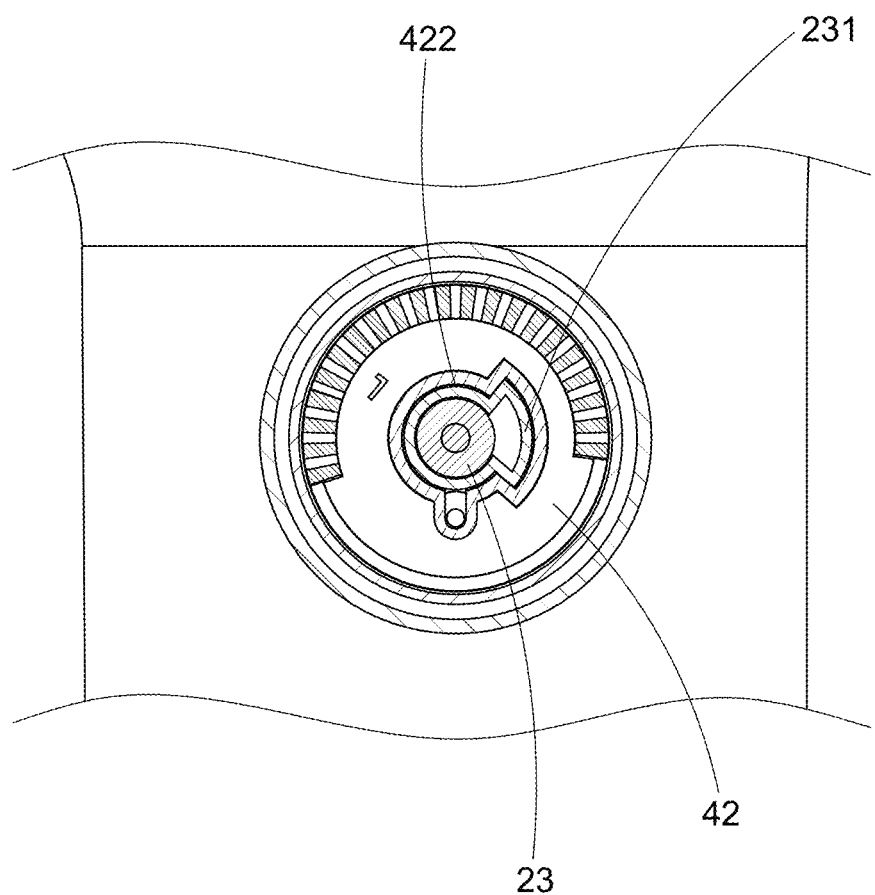
FIG. 6 is a radially directional partial sectional view of the GPS positioning stake of the first embodiment of the present invention, showing a first gear is fixedly sleeved onto a rotation axle.

Referring to FIG. 4 and FIG. 5, the first gear 42 has a first teeth portion 421, and the position limiting block 231 of the rotation axle 23 fits in a position limiting hole 422 of the first gear 42, so that the first gear 42 is fixedly sleeved onto the rotation axle 23 and placed in the fixed seat 22 (as shown in FIG. 6).

The second gear 44 is sleeved onto the rotation axle 23 by an axial hole 441, and an end of the axial hole 441 has two supporting portions 442. The second gear 44 has a second teeth portion 443 facing toward the first teeth portion 421, and a first slope 444 surrounded by the second teeth portion 443 (as shown in FIG. 5). The outer peripheral edge of the second gear 44 has two embedded recesses 445 provided oppositely.

Figure 7:
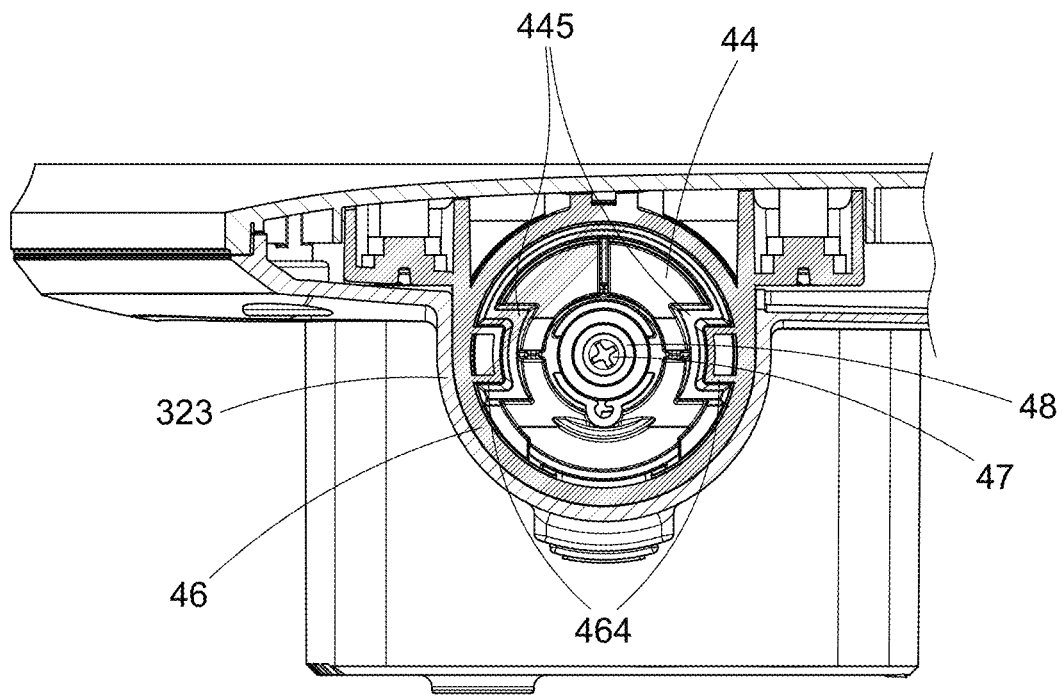
FIG. 7 is a radially directional partial sectional view of the GPS positioning stake of the first embodiment of the present invention, showing a protecting cover is sleeved onto a second gear.
Figure 8:
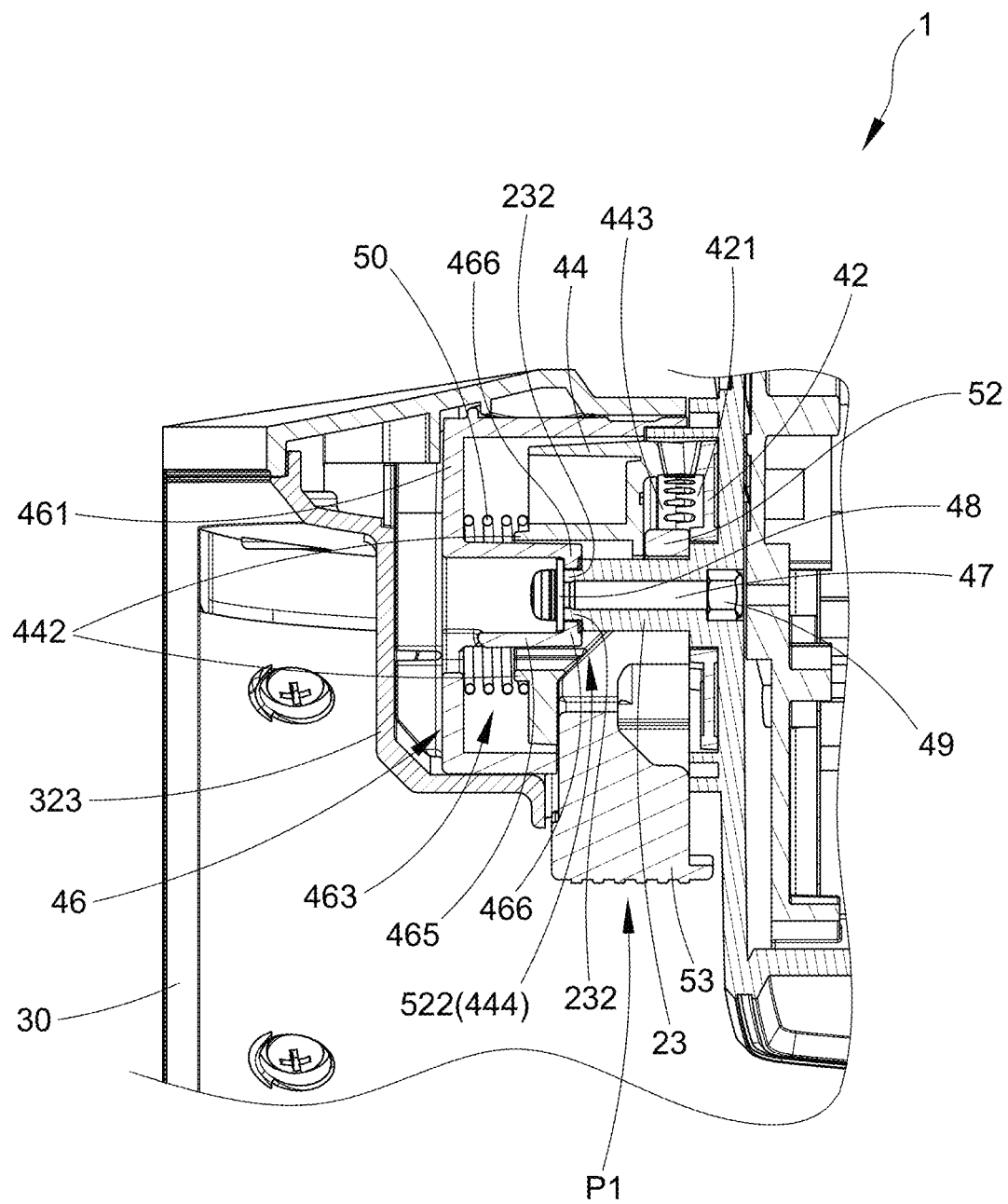
FIG. 8 is an axially directional partial sectional view of the GPS positioning stake of the first embodiment of the present invention, showing a pressed rod is located at a lock position.

The protecting cover 46 is fixedly disposed on the upper adjustment section 311 of the upper covering plate 31 and located in the axle sleeving portion 323 of the lower covering plate 32. As shown in FIG. 4 and FIG. 5, the protecting cover 46 has a bottom plate 461, an annular body portion 462 extending from the bottom plate 461, an accommodating space 463 formed by the bottom plate 461 and the annular body portion 462, two embedded protrusions 464 oppositely provided on the inner wall surface of the annular body portion 462, and a fixed pipe 465 extending from the bottom plate 461 and located in the annular body portion 462. An end of the fixed pipe 465 has a flange 466. As shown in FIG. 7 and FIG. 8, the embedded protrusions 464 of the protecting cover 46 are embedded in the embedded recesses 445 of the second gear 44, and the fixed pipe 465 is inserted through the axial hole 441 of the second gear 44 as shown in FIG. 4 and sleeved onto the connecting portion 232 of the rotation axle 23 by the flange 466. The fixed pipe 465 and the rotation axle 23 are pivotably connected with each other by a bolt 47, a spacer 48 and a nut 49, so that through the protecting cover 46, the axle sleeving portion 323 can drive the second gear 44 to rotate relative to the rotation axle 23 and allow the second gear 44 to displace along the axial direction of the rotation axle 23 relative to the rotation axle 23, the axle sleeving portion 323 and the protecting cover 46.

As shown in FIG. 4, the elastic member 50 is implemented by a coil spring. The elastic member 50 is accommodated in the accommodating space 463 of the protecting cover 46. An end of the elastic member 50 is sleeved onto the supporting portions 442 of the second gear 44, and then another end of the elastic member 50 is abutted on the bottom plate 461 of the protecting cover 46. In this way, the elastic member 50 provides an elastic restoring force acted on the second gear 44 to make the second gear 44 displace toward the first gear 42 (as shown in FIG. 8 and FIG. 9).

As shown in FIG. 4 and FIG. 5, in this embodiment, the operation member 51 is a pressed rod. The pressed rod has a pushing portion 52 and a force receiving portion 53, wherein the pushing portion 52 is located in the axle sleeving portion 323 and sleeved onto the rotation axle 23 by an elongated hole 521, so that the pressed rod is displaceable upwardly and downwardly relative to the rotation axle 23 along the radial direction of the rotation axle 23. The pushing portion 52 further has a second slope 522. The second slope 522 of the pushing portion 52 is abutted on the first slope 444 of the second gear 44. The force receiving portion 53 is exposed out of the axle sleeving portion 323 for being pressed by an external force, so that the pressed rod acted by the external force is displaceable relative to the rotation axle 23 along the radial direction of the rotation axle 23 from a lock position P1 (as shown in FIG. 8) to an unlock position P2 (as shown in FIG. 9). When the pressed rod is located at the lock position P1 as shown in FIG. 8, the second teeth portion 443 of the second gear 44 is engaged with the first teeth portion 421 of the first gear 42 to disable the axle sleeving portion 323 of the adjustment board 30 from driving the second gear 44 to rotate relative to the rotation axle 23. In the process that the pressed rod is moved from the lock position P1 as shown in FIG. 8 toward the unlock position P2 as shown in FIG. 9, the second slope 522 of the pushing portion 52 of the pressed rod pushes the first slope 444 of the second gear 44 to make the second gear 44 move along the axial direction of the rotation axle 23 toward the direction away from the first gear 42. When the pressed rod arrives at the unlock position P2 as shown in FIG. 9, the pushing portion 52 of the pressed rod is inserted between the second teeth portion 443 and the first teeth portion 421 to separate the second teeth portion 443 of the second gear 44 from the first teeth portion 421 of the first gear 42 to enable the axle sleeving portion 323 of the adjustment board 30 to drive the second gear 44 to rotate relative to the rotation axle 23.

Figure 9:
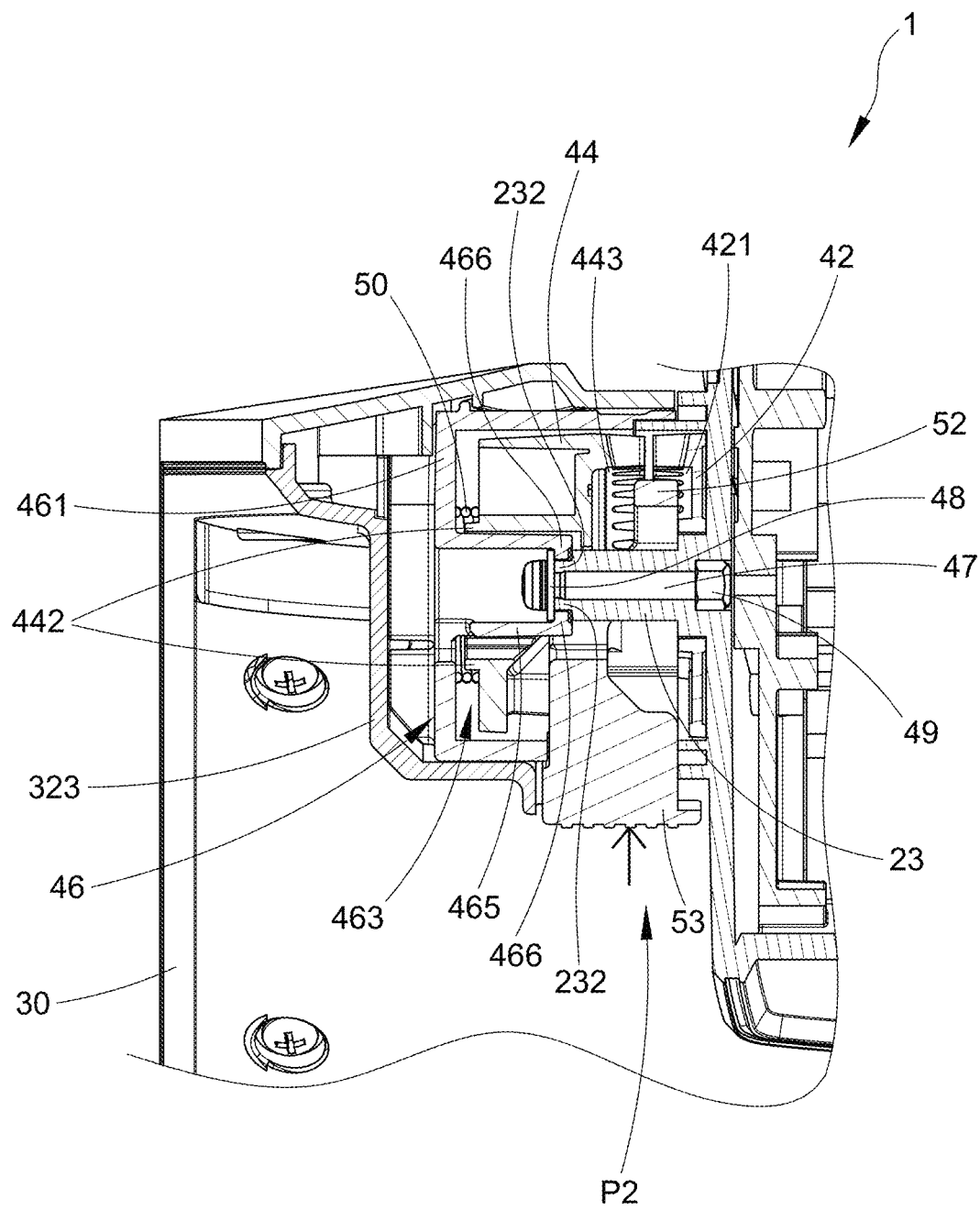
FIG. 9 is similar to FIG. 8, showing the pressed rod is located at an unlock position.

It can be known from the above description that for the GPS positioning stake 1 of the first embodiment of the present invention, when the angle adjustment of the adjustment board 30 is to be performed, at first, a pressing force has to be applied to the force receiving portion 53 of the pressed rod to displace the pressed rod from the lock position P1 as shown in FIG. 8 to the unlock position P2 as shown in FIG. 9. At this time, the pressed rod forces the second teeth portion 443 of the second gear 44 to separate from the first teeth portion 421 of the first gear 42, so that through the axle sleeving portion 323 and the protecting cover 46, the adjustment board 30 can drive the second gear 44 to rotate relative to the rotation axle 23. Thus, the adjustment board 30 is allowed to be rotated relative to the rotation axle 23 for the adjustment of the light receiving angle of the solar panel 314. At this time, the elastic member 50 is compressed by the second gear 44 and thereby stores the elastic restoring force. Once the adjustment board 30 is adjusted to the proper angle, the pressing force applied to the force receiving portion 53 of the pressed rod can be released. At this time, the elastic restoring force released by the elastic member 50 is acted on the second gear 44, and the first slope 444 of the second gear 44 pushes the second slope 522 of the pushing portion 52 of the pressed rod to make the pressed rod move from the unlock position P2 as shown in FIG. 9 back to the lock position P1 as shown in FIG. 8. At this time, the second teeth portion 443 of the second gear 44 is engaged with the first teeth portion 421 of the first gear 42 again, and thus the adjustment board 30 is disabled from rotation relative to the rotation axle 23, and the adjustment of the light receiving angle of the solar panel 314 is accomplished.

Figure 10:
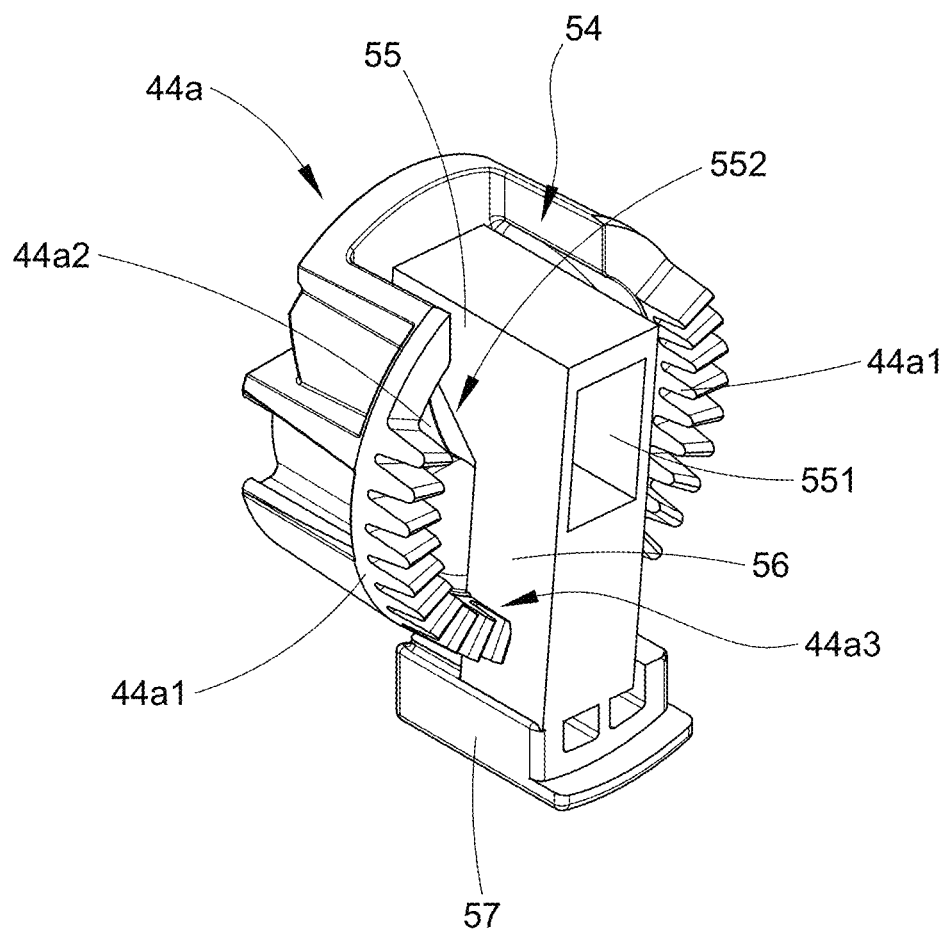
FIG. 10 is an assembled perspective view of a pulled rod and a second gear of a second embodiment of the present invention.
Figure 11:
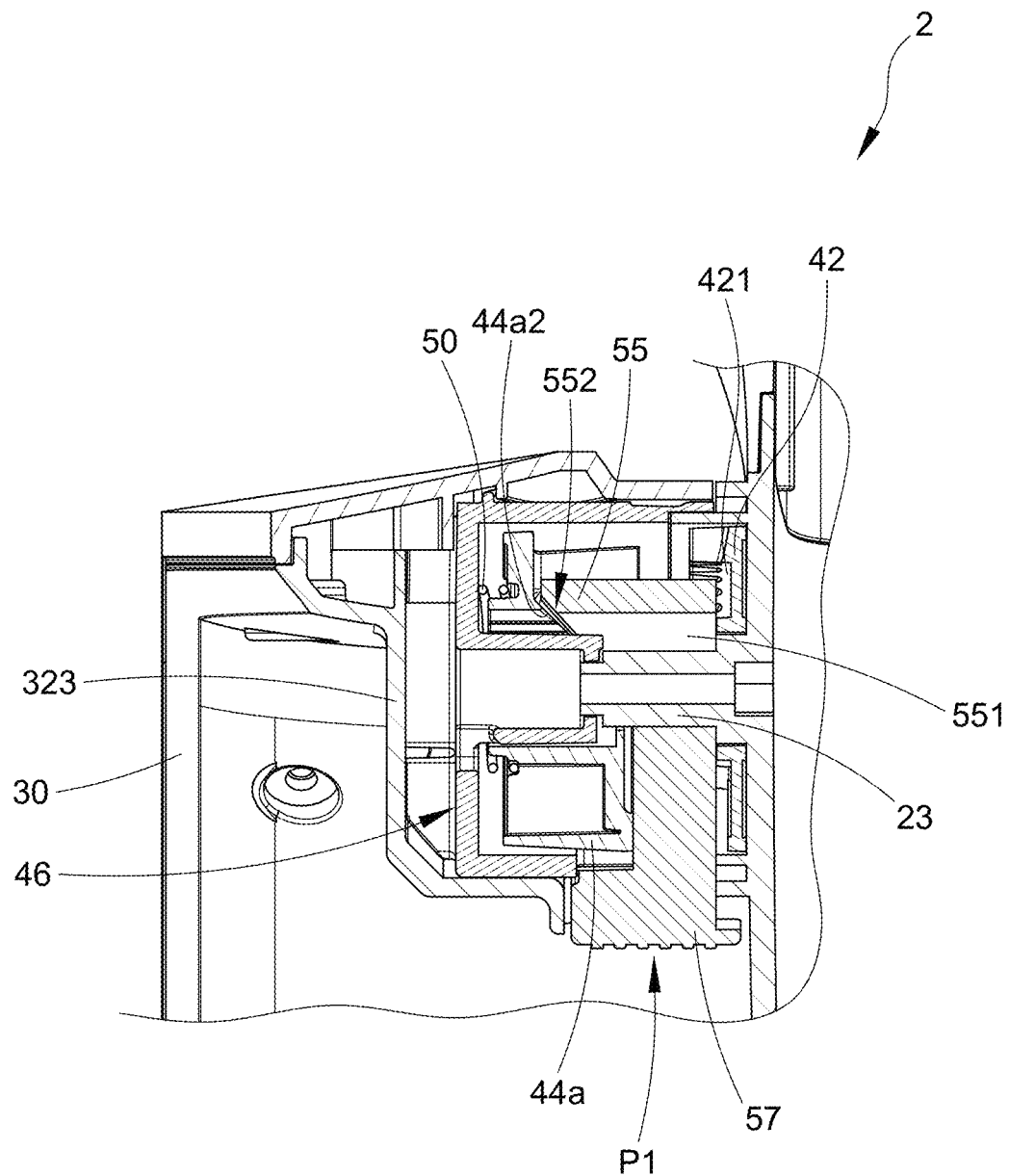
FIG. 11 is an axially directional partial sectional view of a GPS positioning stake of the second embodiment of the present invention, showing the pulled rod is located at a lock position.

However, the GPS positioning stake 1 is unlimited to that disclosed in this embodiment. Referring to FIG. 10, a GPS positioning stake 2 of a second embodiment of the present invention is approximately the same in structure with the first embodiment, but the primary difference therebetween is that another second gear 44a is provided in this embodiment. The second gear 44a in this embodiment is approximately the same in structure with the second gear 44 in the above-described first embodiment, but the primary difference therebetween is that the second gear 44a in this embodiment has two second teeth portions 44a1, a first slope 44a2 surrounded by the second teeth portion 44a1, and a breach 44a3 located between the second teeth portions 44a1. The second teeth portions 44a1 face toward the first teeth portion 421 of the first gear 42. The operation member 54 in this embodiment is a pulled rod. The pulled rod has a pushing portion 55, an embedded portion 56 connected with the pushing portion 55, and a force receiving portion 57 connected with the embedded portion 56. As shown in FIG. 11, the pushing portion 55 is located in the axle sleeving portion 323 and sleeved onto the rotation axle 23 by an elongated hole 551, so that the pulled rod is displaceable upwardly and downwardly relative to the rotation axle 23 along the radial direction of the rotation axle 23. The pushing portion 55 further has a third slope 552. The third slope 552 is abutted on the first slope 44a2 of the second gear 44a. The embedded portion 56 is embedded in the breach 44a3 of the second gear 44a (as shown in FIG. 10). The force receiving portion 57 is exposed out of the axle sleeving portion 323 for being pulled by an external force so that the pulled rod acted by the external force is displaceable relative to the rotation axle 23 along the radial direction of the rotation axle 23 from a lock position P1 (as shown in FIG. 11) to an unlock position P2 (as shown in FIG. 12).

When the pulled rod is located at the lock position P1 as shown in FIG. 11, the second teeth portions 44a1 of the second gear 44a as shown in FIG. 10 are engaged with the first teeth portion 421 of the first gear 42 to disable the axle sleeving portion 323 of the adjustment board 30 from driving the second gear 44a to rotate relative to the rotation axle 23. In the process that the pulled rod is moved from the lock position P1 as shown in FIG. 11 toward the unlock position P2 as shown in FIG. 12, the third slope 552 of the pushing portion 55 of the pulled rod pushes the first slope 44a2 of the second gear 44a to make the second gear 44a move along the axial direction of the rotation axle 23 toward the direction away from the first gear 42. When the pulled rod arrives at the unlock position P2 as shown in FIG. 12, the pushing portion 55 of the pulled rod is inserted between the second teeth portion 44a1 and the first teeth portion 421 to separate the second teeth portion 44a1 of the second gear 44a from the first teeth portion 421 of the first gear 42 to enable the axle sleeving portion 323 of the adjustment board 30 to drive the second gear 44a to rotate relative to the rotation axle 23.

Figure 12:
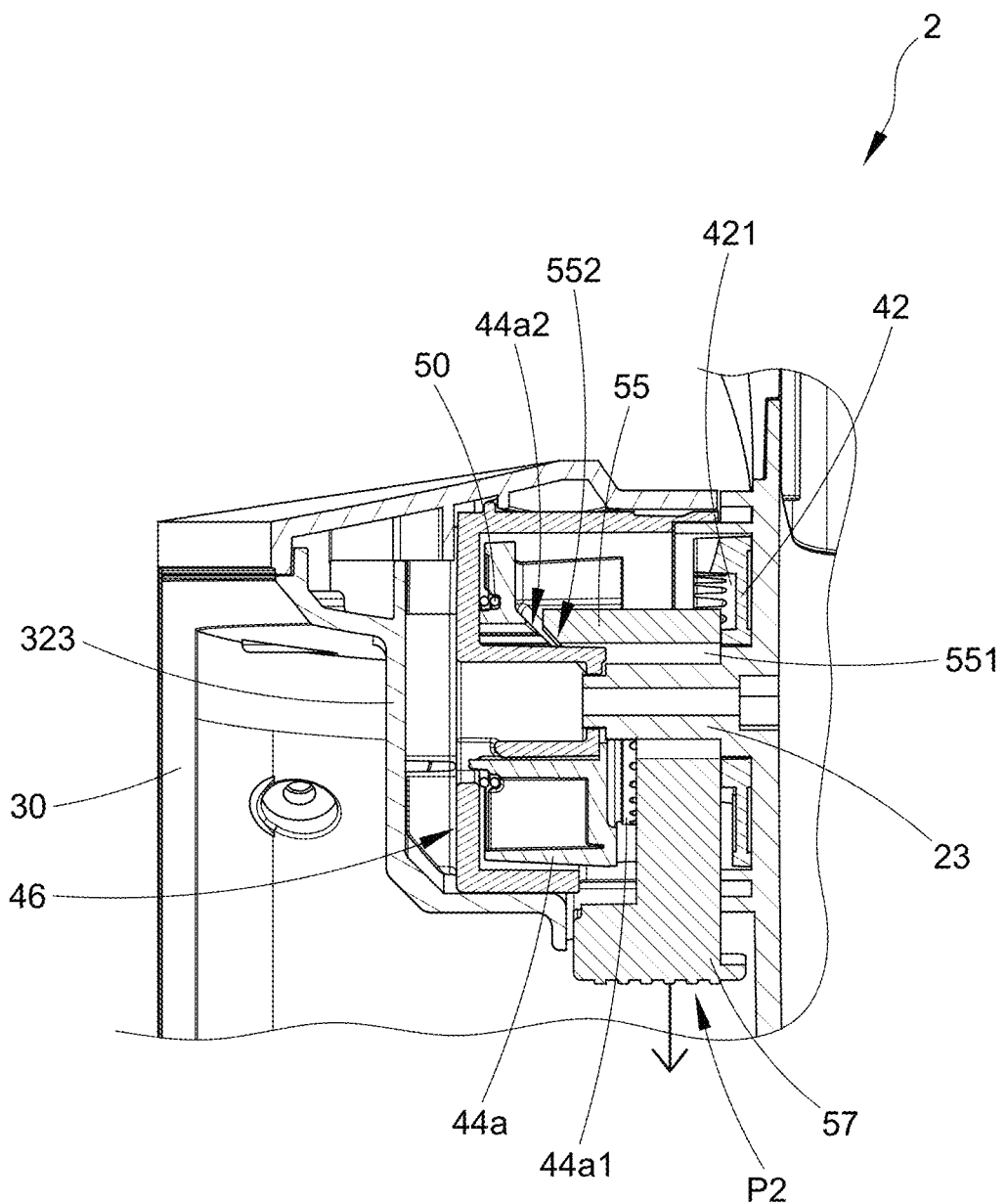
FIG. 12 is similar to FIG. 11, showing the pulled rod is located at an unlock position.

Referring to FIG. 11 and FIG. 12, for the GPS positioning stake 2 of the second embodiment of the present invention, when the angle adjustment of the adjustment board 30 is to be performed, at first, a pulling force has to be applied to the force receiving portion 57 of the pulled rod to displace the pulled rod from the lock position P1 as shown in FIG. 11 to the unlock position P2 as shown in FIG. 12. At this time, the pulled rod forces the second teeth portion 44a1 of the second gear 44a to separate from the first teeth portion 421 of the first gear 42, so that through the axle sleeving portion 323 and the protecting cover 46, the adjustment board 30 can drive the second gear 44a to rotate relative to the rotation axle 23. Thus, the adjustment board 30 is allowed to be rotated relative to the rotation axle 23 for the adjustment of the light receiving angle of the solar panel 314. At this time, the elastic member 50 is compressed by the second gear 44a and thereby stores the elastic restoring force. Once the adjustment board 30 is adjusted to the proper angle, the pulling force applied to the force receiving portion 57 of the pulled rod can be released. At this time, the elastic restoring force released by the elastic member 50 is acted on the second gear 44a, and the first slope 44a2 of the second gear 44a pushes the third slope 552 of the pushing portion 55 of the pulled rod to make the pulled rod move from the unlock position P2 as shown in FIG. 12 back to the lock position P1 as shown in FIG. 11. At this time, the second teeth portions 44a1 of the second gear 44a (as shown in FIG. 10) are engaged with the first teeth portion 421 of the first gear 42 again, and thus the adjustment board 30 is disabled from rotation relative to the rotation axle 23, and the adjustment of the light receiving angle of the solar panel 314 is accomplished.

Figure 13:
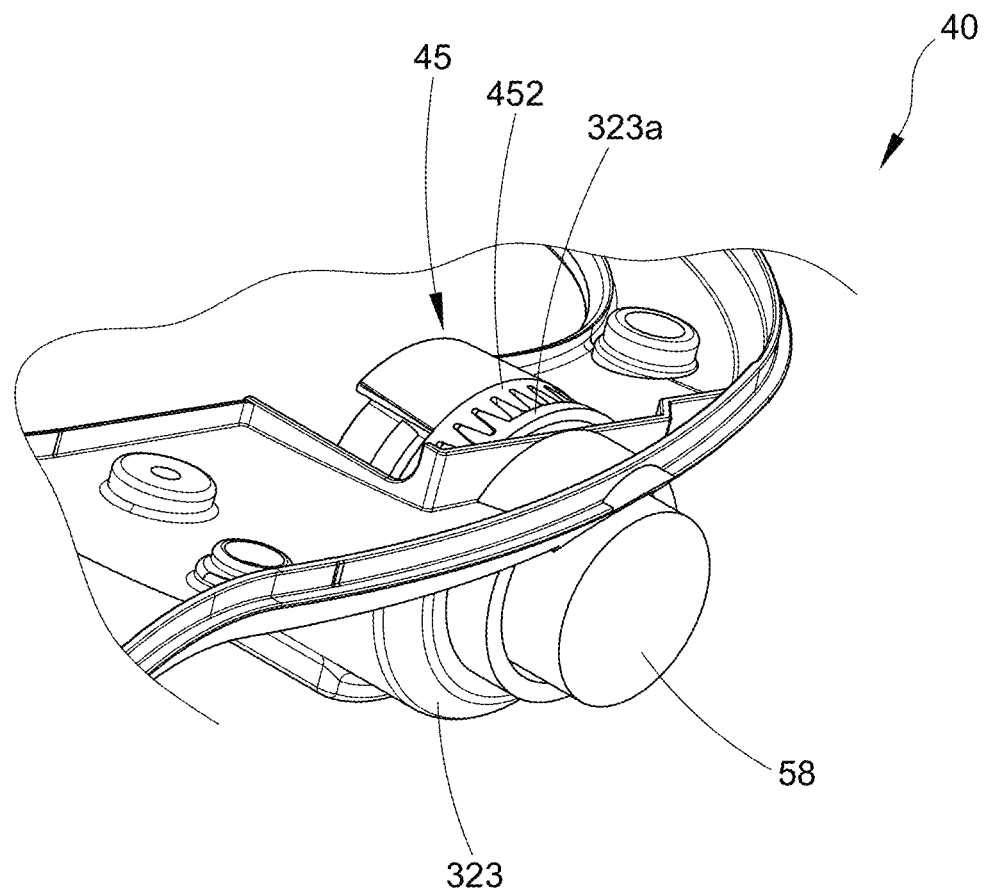
FIG. 13 is a partial exploded perspective view of a GPS positioning stake of a third embodiment of the present invention, showing an engaging teeth portion of an engaging gear is engaged with a teeth portion of an axle sleeving portion.
Figure 14:
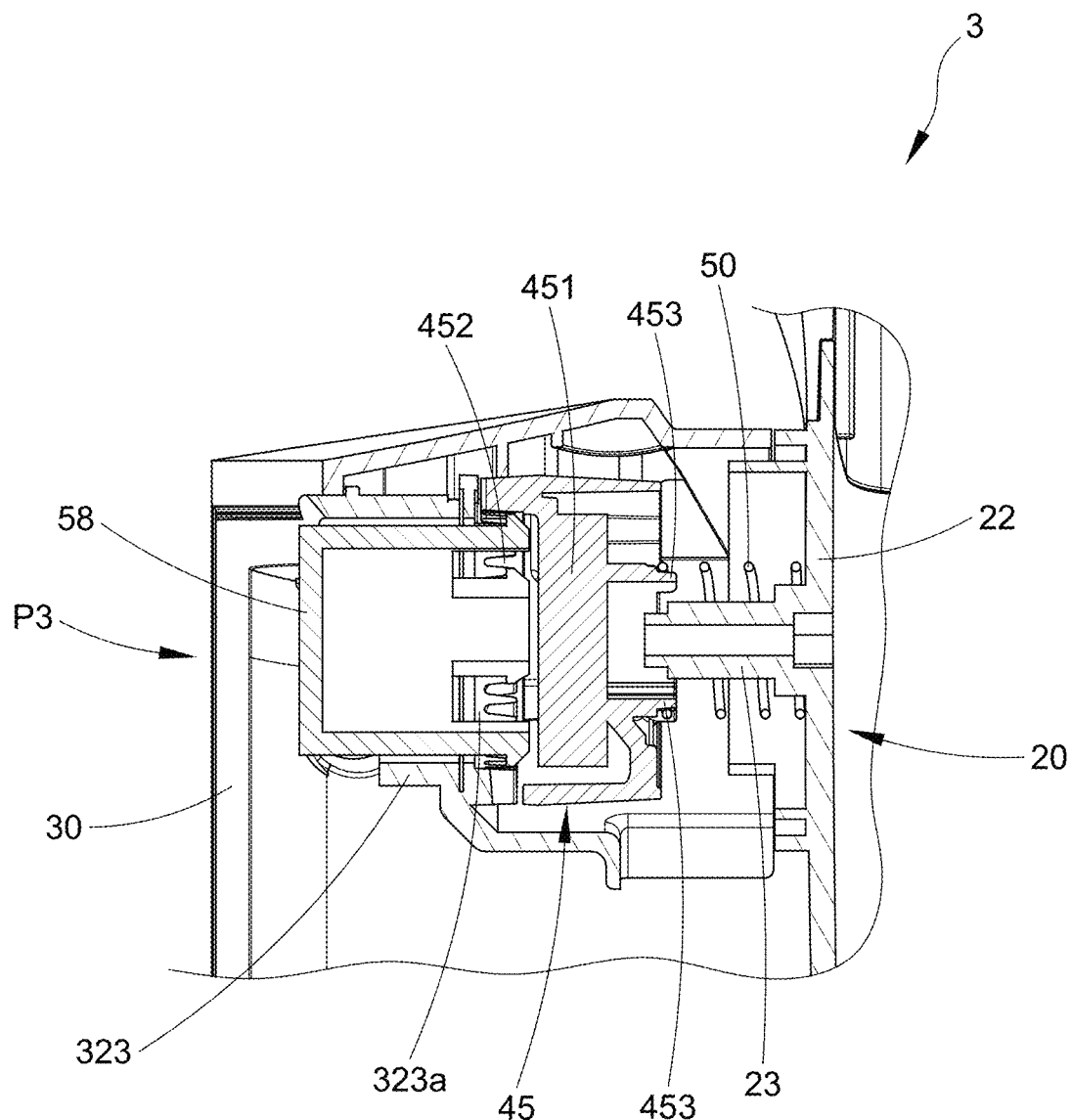
FIG. 14 is an axially directional partial sectional view of the GPS positioning stake of the third embodiment of the present invention, showing a button is located at a lock position.
Figure 15:
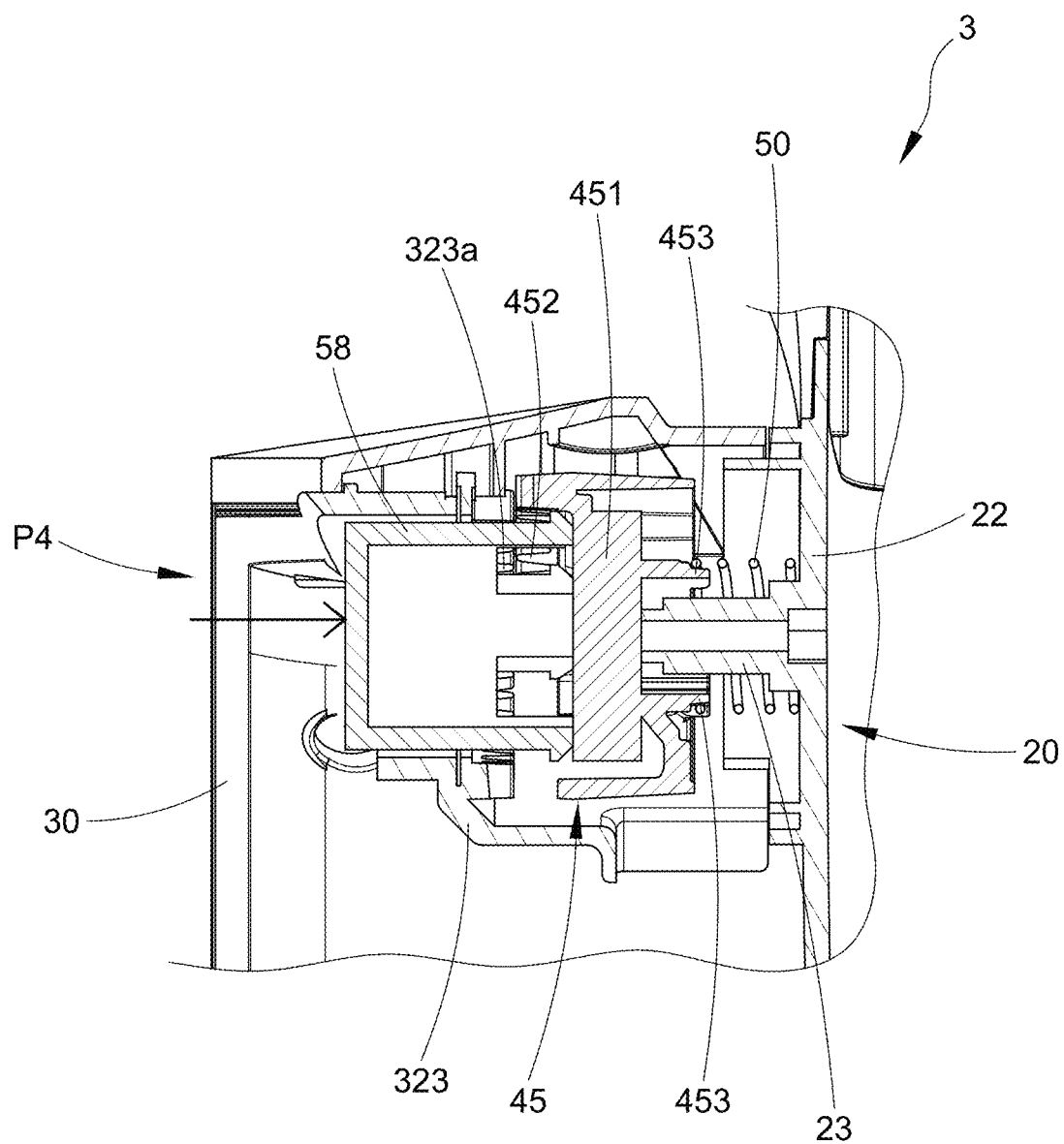
FIG. 15 is similar to FIG. 14, showing the button is located at an unlock position.

Referring to FIG. 13 to FIG. 15, a GPS positioning stake 3 of a third embodiment of the present invention is approximately the same in structure with the above-described first embodiment, but the primary difference therebetween is that the angle adjusting devices 40 thereof are different in structure. As shown in FIG. 13, in this embodiment, an inner peripheral surface of the axle sleeving portion 323 has a teeth portion 323a, which is completely the same in structure with the first teeth portion 421 of the first gear 42. In addition, in this embodiment, the angle adjusting device 40 provides an engaging gear 45, as shown in FIG. 13 and FIG. 14. The engaging gear 45 is approximately the same in structure with the second gear 44 in the above-described first embodiment, but the primary difference therebetween is that the engaging gear 45 has a flat plate portion 451, an engaging teeth portion 452 located on the outer peripheral edge of the flat plate portion 451, and two supporting portions 453 located at another end of the flat plate portion 451. An end of the elastic member 50 is sleeved onto the supporting portions 453 of the engaging gear 45, and the other end is sleeved onto the rotation axle 23 and abutted against the fixed seat 22 of the base 20. In this embodiment, the operation member 58 is a button. A part of the button is inserted in the axle sleeving portion 323, and another part is exposed out of the axle sleeving portion 323 for being pressed by an external force so that the button acted by the external force is displaceable relative to the rotation axle 23 along the axial direction of the rotation axle 23 from a lock position P3 (as shown in FIG. 14) to an unlock position P4 (as shown in FIG. 15). When the button is located at the lock position P3 as shown in FIG. 14, the engaging teeth portion 452 of the engaging gear 45 is engaged with the teeth portion 323a of the axle sleeving portion 323 to disable the adjustment board 30 from rotation relative to the rotation axle 23. In the process that the button is moved from the lock position P3 as shown in FIG. 14 toward the unlock position P4 as shown in FIG. 15, an end of the button is abutted against the flat plate portion 451 of the engaging gear 45 to make the engaging gear 45 move along the axial direction of the rotation axle 23 toward the direction away from the teeth portion 323a of the axle sleeving portion 323. When the button arrives at the unlock position P4 as shown in FIG. 15, the engaging teeth portion 452 of the engaging gear 45 is separated from the teeth portion 323a of the axle sleeving portion 323 to enable the adjustment board 30 to rotate relative to the rotation axle 23.

Referring to FIG. 14 and FIG. 15, for the GPS positioning stake 3 of the third embodiment of the present invention, when the angle adjustment of the adjustment board 30 is to be performed, at first, a pressing force has to be applied to the button (operation member 58) to displace the button from the lock position P3 as shown in FIG. 14 to the unlock position P4 as shown in FIG. 15. At this time, the button is abutted against the flat plate portion 451 of the engaging gear 45 and pushes the engaging gear 45 to separate the engaging teeth portion 452 of the engaging gear 45 from the teeth portion 323a of the axle sleeving portion 323, so that the user can stir the adjustment board 30. Thus, the adjustment board 30 is allowed to be rotated relative to the rotation axle 23 for the adjustment of the light receiving angle of the solar panel 314. At this time, the elastic member 50 is compressed by the engaging gear 45 and thereby stores the elastic restoring force. Once the adjustment board 30 is adjusted to the proper angle, the pressing force applied to the button can be released. At this time, the elastic restoring force released by the elastic member 50 is acted on the engaging gear 45, and the flat plate portion 451 of the engaging gear 45 pushes the button to make the button move from the unlock position P4 as shown in FIG. 15 back to the lock position P3 as shown in FIG. 14. At this time, the engaging teeth portion 452 of the engaging gear 45 is engaged with the teeth portion 323a of the axle sleeving portion 323 again, and thus the adjustment board 30 is disabled from rotation relative to the rotation axle 23, and the adjustment of the light receiving angle of the solar panel 314 is accomplished.

Figure 16:
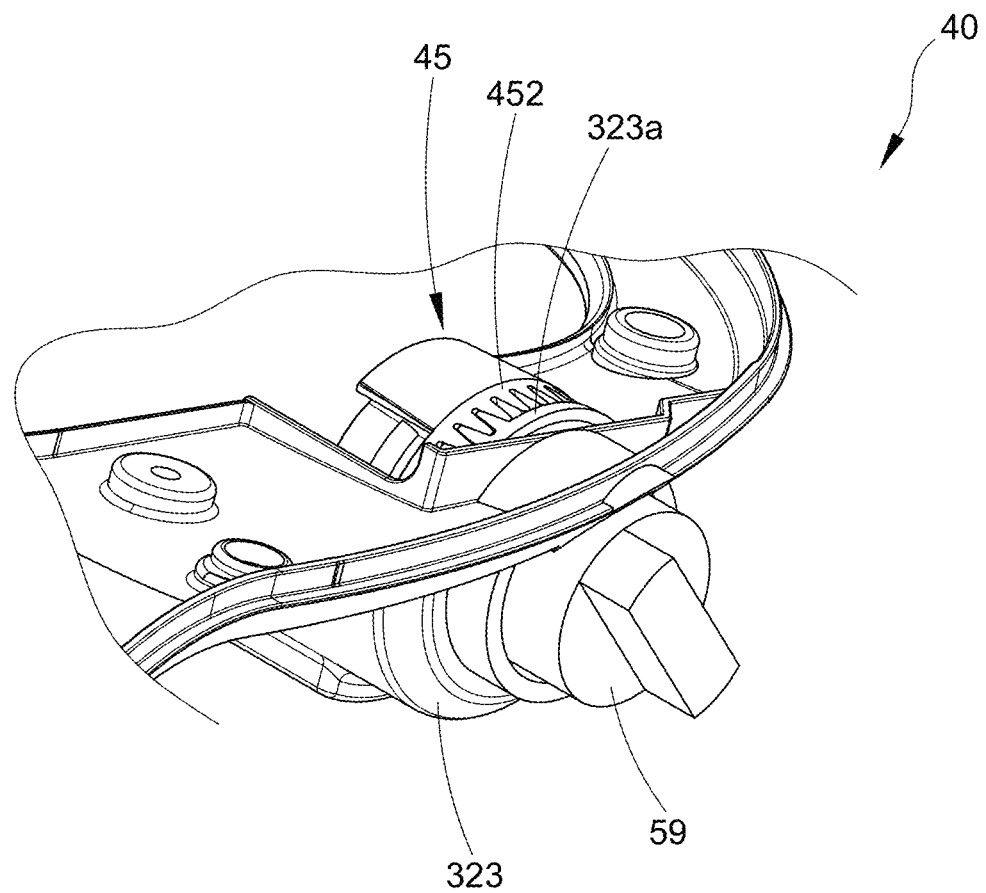
FIG. 16 is a partial exploded perspective view of a GPS positioning stake of a fourth embodiment of the present invention, showing an engaging teeth portion of an engaging gear is engaged with a teeth portion of an axle sleeving portion.
Figure 17:
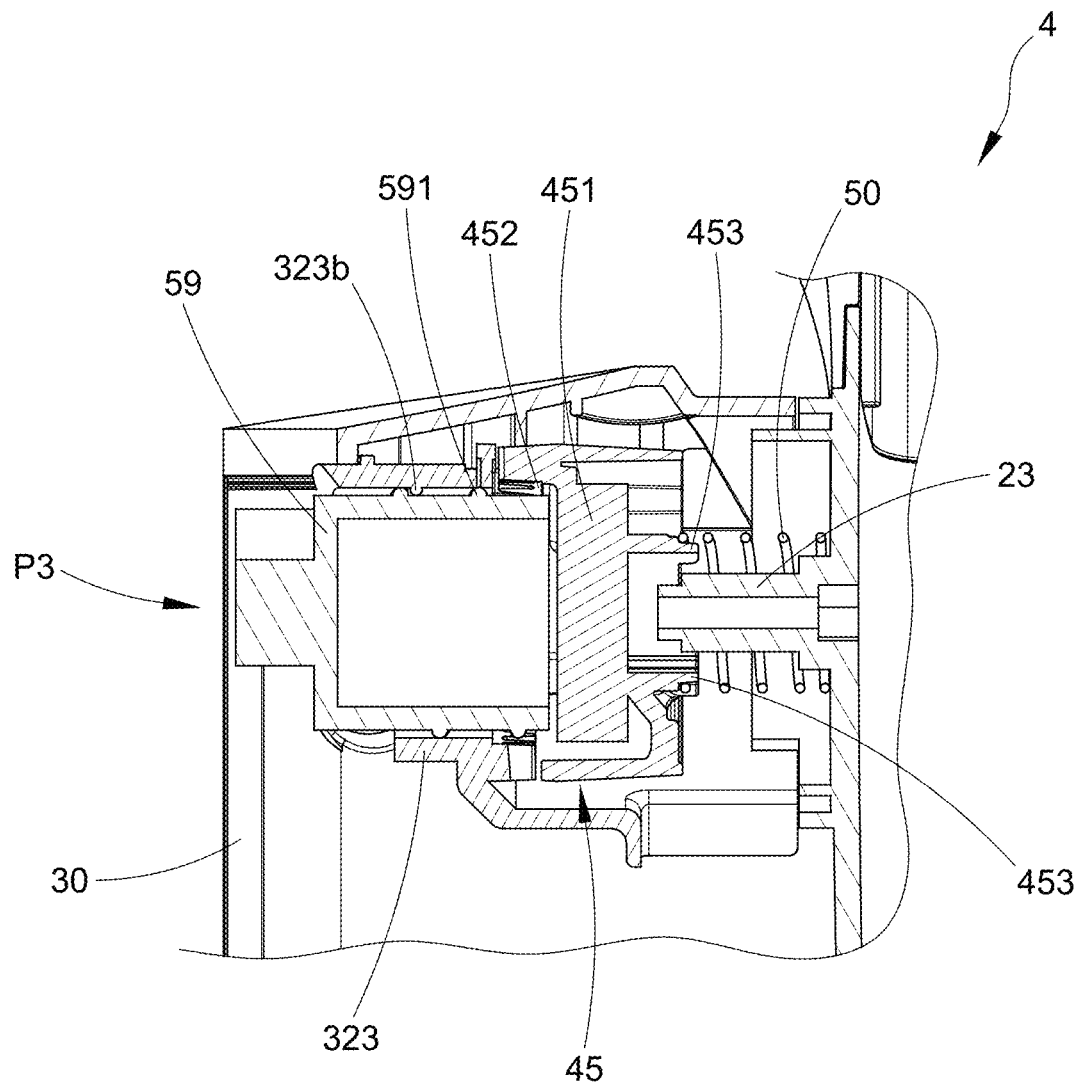
FIG. 17 is an axially directional partial sectional view of a GPS positioning stake of the fourth embodiment of the present invention, showing a knob is located at a lock position.
Figure 18:
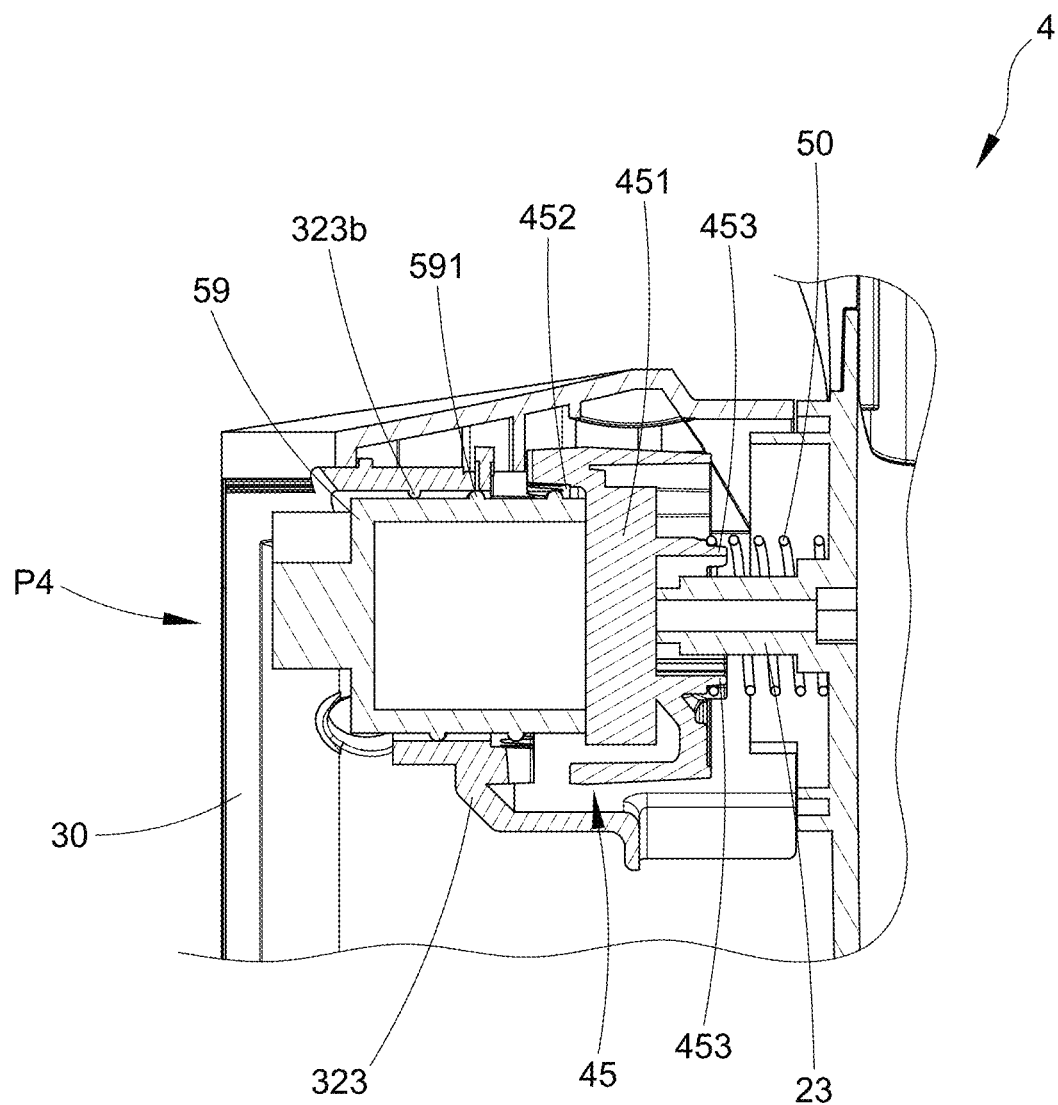
FIG. 18 is similar to FIG. 17, showing the knob is located at an unlock position.

Referring to FIG. 16 to FIG. 18, a GPS positioning stake 4 of a fourth embodiment of the present invention is approximately the same in structure with the GPS positioning stake 3 of the third embodiment, but the primary difference therebetween is that the angle adjusting devices 40 thereof are different in structure. As shown in FIG. 17 and FIG. 18, in this embodiment, the inner peripheral surface of the axle sleeving portion 323 has an annular flange 323b. The operation member 59 is a knob, and an outer peripheral surface of the knob has a thread 591. A part of the knob is inserted in the axle sleeving portion 323, and the thread 591 is abutted against the annular flange 323b of the axle sleeving portion 323. Another part of the knob is exposed out of the axle sleeving portion 323 for being rotated so that the thread 591 of the knob is guided by the annular flange 323b to displace along the axial direction of the rotation axle 23 from a lock position P3 (as shown in FIG. 17) to an unlock position P4 (as shown in FIG. 18). When the knob is located at the lock position P3 as shown in FIG. 17, the engaging teeth portion 452 of the engaging gear 45 is engaged with the teeth portion 323a of the axle sleeving portion 323 (as shown in FIG. 16) to disable the adjustment board 30 from rotation relative to the rotation axle 23. In the process that the knob is moved from the lock position P3 as shown in FIG. 17 toward the unlock position P4 as shown in FIG. 18, an end of the knob is abutted against the flat plate portion 451 of the engaging gear 45 to make the engaging gear 45 move along the axial direction of the rotation axle 23 toward the direction away from the teeth portion 323a of the axle sleeving portion 323. When the knob arrives at the unlock position P4 as shown in FIG. 18, the engaging teeth portion 452 of the engaging gear 45 is separated from the teeth portion 323a of the axle sleeving portion 323 to enable the adjustment board 30 to rotate relative to the rotation axle 23.

Referring to FIG. 17 and FIG. 18, for the GPS positioning stake 4 of the fourth embodiment of the present invention, when the angle adjustment of the adjustment board 30 is to be performed, at first, a rotating force has to be applied to the knob (operation member 59) to displace the knob from the lock position P3 as shown in FIG. 17 to the unlock position P4 as shown in FIG. 18. At this time, the knob is abutted against the flat plate portion 451 of the engaging gear 45 and pushes the engaging gear 45 to separate the engaging teeth portion 452 of the engaging gear 45 from the teeth portion 323a of the axle sleeving portion 323 as shown in FIG. 16, so that the user can stir the adjustment board 30. Thus, the adjustment board 30 is allowed to be rotated relative to the rotation axle 23 for the adjustment of the light receiving angle of the solar panel 314. At this time, the elastic member 50 is compressed by the engaging gear 45 and thereby stores the elastic restoring force. Once the adjustment board 30 is adjusted to the proper angle, the user can rotate the knob reversely. At this time, the elastic restoring force released by the elastic member 50 is acted on the engaging gear 45, and the flat plate portion 451 of the engaging gear 45 pushes the knob to make the knob move from the unlock position P4 as shown in FIG. 18 back to the lock position P3 as shown in FIG. 17. At this time, the engaging teeth portion 452 of the engaging gear 45 is engaged with the teeth portion 323a of the axle sleeving portion 323 (as shown in FIG. 16) again, and thus the adjustment board 30 is disabled from rotation relative to the rotation axle 23, and the adjustment of the light receiving angle of the solar panel 314 is accomplished.

Figure 19:
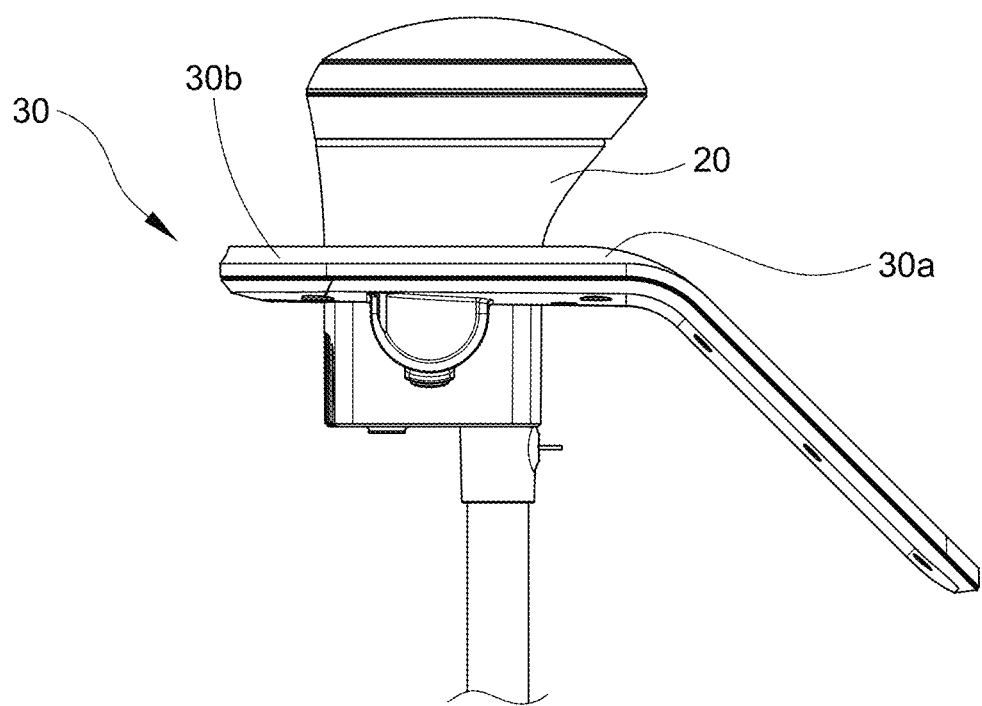
FIG. 19 is a side view of the GPS positioning stake of the present invention, showing the status that an adjustment board is not adjusted.
Figure 20:
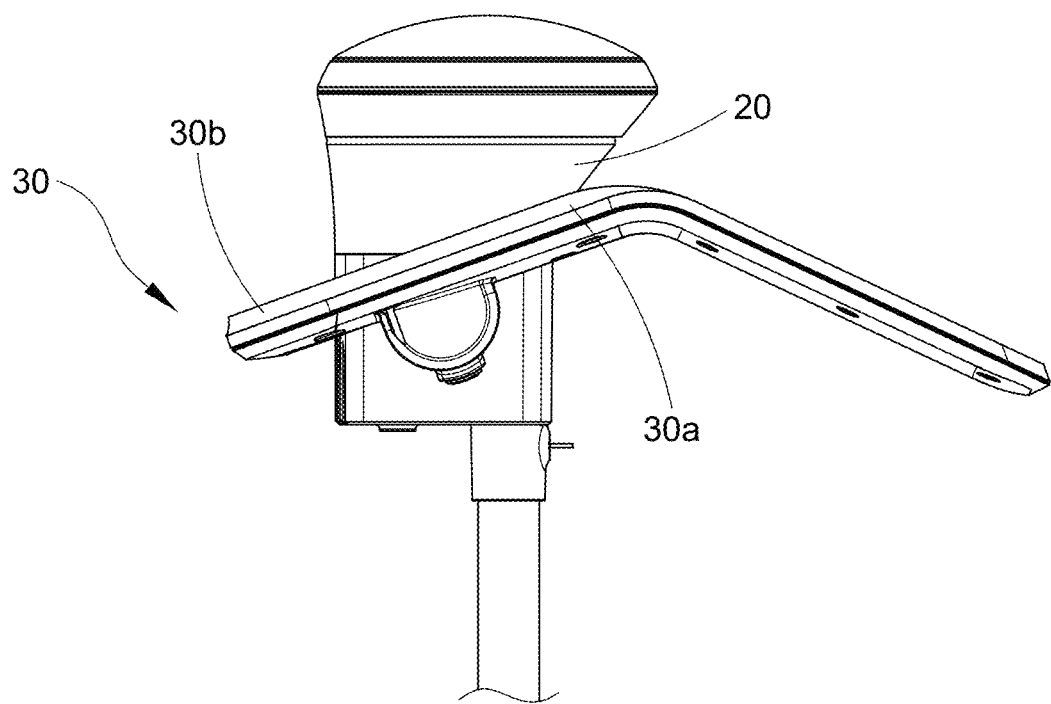
FIG. 20 is similar to FIG. 19, showing the status that a first end portion of the adjustment board is abutted against a base.
Figure 21:
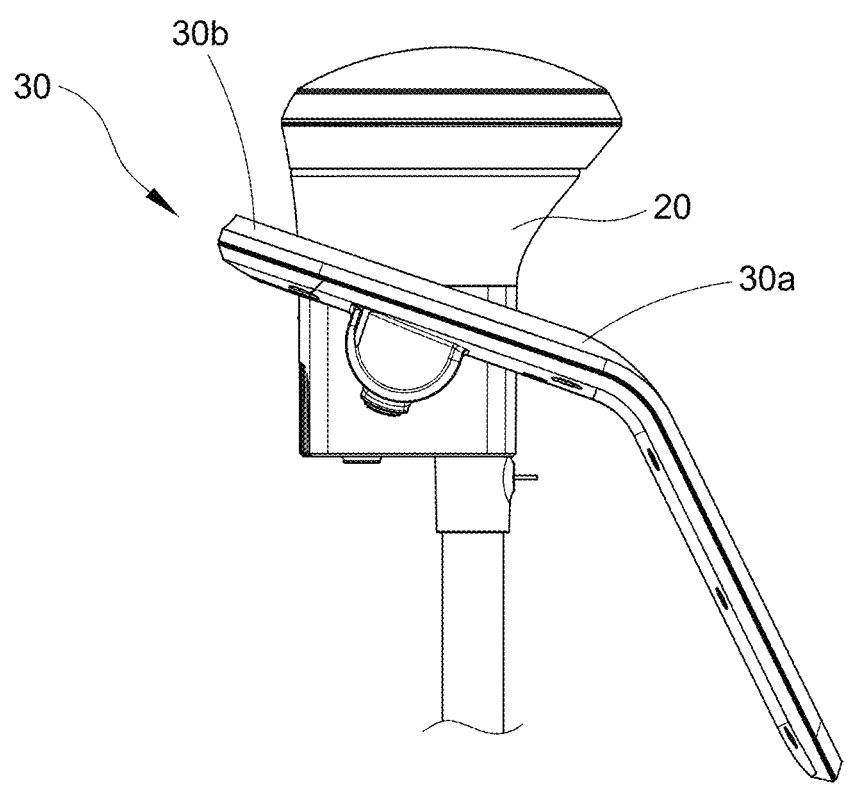
FIG. 21 is similar to FIG. 20, showing the status that a second end portion of the adjustment board is abutted against the base.

It should be supplementarily noted here that the adjustment board 30 of the GPS positioning stake 1, 2, 3, 4 of the present invention is provided at two ends of the upper and lower adjustment sections 311 and 321 as shown in FIG. 2 with a first end portion 30a and a second end portion 30b (as shown in FIG. 19) respectively. In the process of the angle adjustment, the adjustment board 30 is allowed to be at farthest rotated to let the first end portion 30a abutted against the base 20 (as shown in FIG. 20), or rotated to let the second end portion 30b abutted against the base 20 (as shown in FIG. 21), such that the angle, for which the adjustment board 30 can be rotated, is limited.

In conclusion, the GPS positioning stake 1, 2, 3, 4 of the present invention is self-powered by the solar panel 314 for the operation of the GPS positioning module 24, which solves the problem of the limited position of the placement of the GPS positioning stake 1, allowing the user to insert the GPS positioning stake 1 of the present invention at any location for positioning the robotic lawn mower. Therefore, the GPS positioning stake 1, 2, 3, 4 of the present invention has relatively higher flexibility in use. Further speaking, the GPS positioning stake 1, 2, 3, 4 of the present invention allows the user to adjust the angle of the adjustment board 30 to increase the probability of the solar panel 314 being illuminated by the sun, so as to increase the energy conversion efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A GPS positioning stake, which is characterized in comprising:
    a supporting pole;
    a base connected with the supporting pole, the base having a GPS positioning module and a rotation axle;
    an adjustment board having an axle sleeving portion and a solar panel, the axle sleeving portion being pivotably connected with the rotation axle, the solar panel providing electric energy for operation of the GPS positioning module; and
    an angle adjusting device comprising:
        a first gear fixedly sleeved onto the rotation axle, the first gear having a first teeth portion;
        a second gear sleeved onto the rotation axle and located in the axle sleeving portion, the second gear being arranged in a way that the second gear is slidable along an axial direction of the rotation axle relative to the rotation axle and the axle sleeving portion and able to be driven by the axle sleeving portion to rotate relative to the rotation axle, the second gear having a second teeth portion facing toward the first teeth portion;
        an elastic member providing an elastic force acted on the second gear to make the second gear displace toward the first gear; and
        an operation member sleeved onto the rotation axle in a way that the operation member is displaceable between a lock position and an unlock position, the operation member having a pushing portion located in the axle sleeving portion and a force receiving portion exposed out of the axle sleeving portion, the force receiving portion being adapted for receiving an external force so that the operation member is displaced relative to the rotation axle from the lock position to the unlock position, when the operation member is located at the lock position, the second teeth portion being engaged with the first teeth portion to disable the axle sleeving portion of the adjustment board from rotation relative to the rotation axle, when the operation member is located at the unlock position, the pushing portion being inserted between the second teeth portion and the first teeth portion to separate the second teeth portion from the first teeth portion to enable the axle sleeving portion of the adjustment board to drive the second gear to rotate relative to the rotation axle.

2. The GPS positioning stake as claimed in claim 1, which is characterized in that the operation member is a pressed rod or a pulled rod; the pressed rod or the pulled rod is sleeved onto the rotation axle in a way that the pressed rod or the pulled rod is displaceable along a radial direction of the rotation axle.

3. The GPS positioning stake as claimed in claim 2, which is characterized in that the second gear has a first slope; when the operation member is the pressed rod, the pushing portion of the pressed rod has a second slope, and the first slope is abutted on the second slope; when the operation member is the pulled rod, the pushing portion of the pulled rod has a third slope, and the first slope is abutted on the third slope.

4. The GPS positioning stake as claimed in claim 1, which is characterized in that the base has a position limiting block; the first gear has a position limiting hole; when the first gear is sleeved onto the rotation axle, the position limiting block fits in the position limiting hole so that the first gear is fixed to the rotation axle.

5. The GPS positioning stake as claimed in claim 1, which is characterized in that the angle adjusting device comprises a protecting cover fixedly disposed in the axle sleeving portion; the protecting cover has a bottom plate, an annular body portion extending from the bottom plate, an accommodating space formed by the bottom plate and the annular body portion, and a fixed pipe extending from the bottom plate and located in the annular body portion; the rotation axle of the base has a connecting portion; the fixed pipe is sleeved onto the connecting portion so that the axle sleeving portion is pivotable relative to the rotation axle.

6. The GPS positioning stake as claimed in claim 5, which is characterized in that the protecting cover has two embedded protrusions located in the annular body portion; the second gear has two embedded recesses provided separately; the embedded protrusions are embedded in the embedded recesses.

7. The GPS positioning stake as claimed in claim 6, which is characterized in that the second gear has a supporting portion; the elastic member is a coil spring and placed in the accommodating space of the protecting cover; an end of the elastic member is sleeved onto the supporting portion; another end of the elastic member is abutted on the bottom plate of the protecting cover.

8. The GPS positioning stake as claimed in claim 1, which is characterized in that the adjustment board has a first end portion and a second end portion; the adjustment board is rotatable until the first end portion is abutted against the base, or the adjustment board is rotatable until the second end portion is abutted against the base.

9. A GPS positioning stake, which is characterized in comprising:
   a supporting pole;
   a base connected with the supporting pole, the base having a GPS positioning module and a rotation axle;
   an adjustment board having an axle sleeving portion and a solar panel, the axle sleeving portion being pivotable relative to the rotation axle, an inner peripheral surface of the axle sleeving portion having a teeth portion, the solar panel providing electric energy for operation of the GPS positioning module; and
   an angle adjusting device comprising:
   an engaging gear sleeved onto the rotation axle and located in the axle sleeving portion, the engaging gear being arranged in a way that the engaging gear is slidable along an axial direction of the rotation axle relative to the rotation axle, the engaging gear having an engaging teeth portion facing toward the teeth portion of the axle sleeving portion;
   an elastic member providing an elastic force acted on the engaging gear to make the engaging gear displace toward the teeth portion of the axle sleeving portion; and
   an operation member inserted in the axle sleeving portion in a way that the operation member is displaceable between a lock position and an unlock position, when the operation member is located at the lock position, the engaging teeth portion of the engaging gear being engaged with the teeth portion of the axle sleeving portion to disable the adjustment board from rotation relative to the rotation axle; when the operation member is located at the unlock position, the operation member pushing the engaging gear to separate the engaging teeth portion of the engaging gear from the teeth portion of the axle sleeving portion to enable the adjustment board to rotate relative to the rotation axle.

10. The GPS positioning stake as claimed in claim 9, which is characterized in that the operation member is a button or a knob; the button or the knob is inserted in the axle sleeving portion in a way that the button or the knob is displaceable along an axial direction of the rotation axle.

11. The GPS positioning stake as claimed in claim 10, which is characterized in that when the operation member is the knob, an outer peripheral surface of the knob has a thread, the inner peripheral surface of the axle sleeving portion has an annular flange, and the thread is abutted against the annular flange.

12. The GPS positioning stake as claimed in claim 9, which is characterized in that the engaging gear has a supporting portion; the elastic member is a coil spring; an end of the elastic member is sleeved onto the supporting portion of the engaging gear; another end of the elastic member is sleeved onto the rotation axle and abutted against the base.

13. The GPS positioning stake as claimed in claim 9, which is characterized in that the adjustment board has a first end portion and a second end portion; the adjustment board is rotatable until the first end portion is abutted against the base, or the adjustment board is rotatable until the second end portion is abutted against the base.

* * * * *